(12) United States Patent
Bleys et al.

(10) Patent No.: US 7,687,548 B2
(45) Date of Patent: Mar. 30, 2010

(54) PROCESS FOR PREPARING A MOULDED POLYURETHANE MATERIAL

(75) Inventors: Gerhard Jozef Bleys, Heverlee (BE); Johan Indesteege, Mol (BE)

(73) Assignee: Huntsman International LLC, Salt Lake City, UT (US)

( * ) Notice: Subject to any disclaimer, the term of this patent is extended or adjusted under 35 U.S.C. 154(b) by 562 days.

(21) Appl. No.: 11/016,070

(22) Filed: Dec. 17, 2004

(65) Prior Publication Data

US 2005/0101682 A1 May 12, 2005

Related U.S. Application Data

(63) Continuation of application No. PCT/EP03/06180, filed on Jun. 12, 2003.

(30) Foreign Application Priority Data

Jul. 1, 2002 (EP) ................... 02014526

(51) Int. Cl.
*C08G 18/10* (2006.01)
*C08J 9/08* (2006.01)
*C08G 18/48* (2006.01)

(52) U.S. Cl. ............................ 521/159; 528/59; 521/65; 521/137; 521/174

(58) Field of Classification Search ................ 521/159, 521/137, 174, 79, 65; 528/59
See application file for complete search history.

(56) References Cited

U.S. PATENT DOCUMENTS

| 3,793,241 A | * | 2/1974 | Kyle et al | 521/159 |
| 4,282,330 A | * | 8/1981 | Austin | 521/118 |
| 4,304,872 A | * | 12/1981 | Tenhagen | 521/52 |
| 4,421,870 A | * | 12/1983 | Stutz et al. | 521/160 |
| 5,489,620 A | | 2/1996 | Bleys | |
| 5,591,779 A | | 1/1997 | Bleys et al. | |
| 6,069,184 A | * | 5/2000 | Bleys et al. | 521/159 |

FOREIGN PATENT DOCUMENTS

| EP | 547765 | 6/1993 |
| EP | 793681 | 5/1996 |
| EP | 741153 | 11/1996 |
| WO | WO 94/29361 | 12/1994 |
| WO | WO 96/16099 | 5/1996 |
| WO | WO 97/21750 | 6/1997 |
| WO | WO 98/00450 | 1/1998 |
| WO | WO 00/55232 | 9/2000 |

OTHER PUBLICATIONS

Callister Jr., William D. Material Science and Engineering an Introduction 6$^{th}$ Edition. New York: John Wiley & Sons, Inc, 2003: 517.*
Saechtling, Dr. Hans Jurgen; "Compression, Injection and Blow Molding", International Plastics Handbook for the Technologist, Engineer, and User; Reprinted 1992, pp. 64-65, Second Edition Reprint, Hanser Publishers, Distributed in the US by Oxford University Press, New York, NY.
Michaeli, Walter; "Compression Molding"; Plastics Processing; an Introduction; 1995; pp. 132-133, Hanser/Gardner Publications, Cincinnati OH.
Unknown author; "Compression Molding"; Molding Solutions, Lexington, KY 40510; URL: http://www.molders.com/compression_molding.html.
Unknown author; "Compression Molding"; University of Southern Mississippi Polymer Science Learning Center;.URL: http://www.pslc.ws/macrog/mpm/composit/fiber/process/compress.htm.

* cited by examiner

*Primary Examiner*—Vasu Jagannathan
*Assistant Examiner*—Benjamin J Gillespie

(57) ABSTRACT

Process for preparing a moulded elastomeric polyurethane material having an overall density of 200-1000 kg/m$^3$, preferably of 200-500 kg/m$^3$, and a compression load at 40% deflection of at least 25 kPa by reacting in a closed mould an isocyanate terminated prepolymer, having an NCO-value of 5-15% by weight and which is the reaction product of a polyisocyanate and a polyether polyol having an average nominal functionality of 2-6, an average equivalent weight of 500-5000 and an oxyethylene content of 50-90% by weight, and water. The elastomer obtained is claimed as well.

1 Claim, No Drawings

PROCESS FOR PREPARING A MOULDED POLYURETHANE MATERIAL

CROSS REFERENCE TO RELATED APPLICATIONS

This application is a continuation of international application PCT/EP2003/006180, filed Jun. 12, 2003, and further claims priority to EP 02014526.4, filed Jul. 1, 2002.

FIELD OF THE INVENTION

The present invention is concerned with a process for preparing moulded polyurethane elastomers having a density of 200-1000 kg/m$^3$ made from a considerable amount of a polyol having a relatively high oxyethylene (EO) content and from high amounts of water.

BACKGROUND OF THE INVENTION

PCT/EP95/04144 and PCT/EP94/01659 are related to the preparation of low density, relatively soft, flexible foams using a high amount of water and a considerable amount of a polyether polyol containing a considerable amount of oxyethylene groups. WO 97/21750, WO 98/00450, and WO 00/55232 relate to the preparation of moulded elastomers using the same type of polyols in high amount and a low amount of water. None of these citations touch upon a problem encountered in making such moulded elastomers.

It is possible to make elastomers with good properties. However, there remains room for improvement, in particular, regarding hydrophylic elastomeric mouldings. Such hydrophylic elastomers could be useful in footwear applications (like in-soles and interliners for leisure and sportswear), furniture applications (like cushioning pads), and in medical applications (like pressure-pads for immobilized patients).

Needless to say that special requirements are needed for such materials because of their close and sometimes intense body contact. The amount of leachable and harmful compounds needs to be reduced as much as possible.

SUMMARY OF THE INVENTION

Surprisingly, we have found that it is possible to make a moulded elastomeric material having good physical properties and comprising less leachable compounds, and, in particular, no catalyst. Therefore, the present invention is concerned with a process for preparing a moulded elastomeric polyurethane material having an overall density of 200-1000 kg/m$^3$ (preferably 200-500 kg/m$^3$) and a compression load at 40% deflection of at least 25 kPa (preferably 50-500 kPa) by reacting, in a closed mould: (a) an isocyanate terminated prepolymer, having an NCO-value value of 5-15% by weight and being the reaction product of a polyisocyanate and a polyether polyol having an average nominal functionality of 2-6, an average equivalent weight of 500-5000 and an oxyethylene content of 50-90% by weight, and (b) 25-500 parts by weight (pbw) of water per 100 parts by weight of prepolymer. Further, the present invention is concerned with a moulded, elastomeric, catalyst free, polyurethane material having an overall density of 200-1000 kg/m$^3$ and preferably of 200-500 kg/m$^3$, a compression load at 40% deflection of at least 25 kPa and preferably of 50-500 kPa and an oxyethylene content of 25-70 and preferably 35-60% by weight. Preferably, such material is made according to the above process.

Most catalysts used in making polyurethane materials are amines and tin compounds. It is a great advantage when such materials can be made without such catalysts. The above process provides this opportunity.

DETAILED DESCRIPTION

The present invention is concerned with a process for preparing a moulded elastomeric polyurethane material having an overall density of 200-1000 kg/m$^3$ (preferably 200-500 kg/m$^3$) and a compression load at 40% deflection of at least 25 kPa (preferably 50-500 kPa) by reacting, in a closed mould: (a) an isocyanate terminated prepolymer, having an NCO-value of 5-15% by weight and being the reaction product of a polyisocyanate and a polyether polyol having an average nominal functionality of 2-6, an average equivalent weight of 500-5000 and an oxyethylene content of 50-90% by weight, and (b) 25-500 parts by weight (pbw) of water per 100 parts by weight of prepolymer. Further, the present invention is concerned with a moulded, elastomeric, catalyst free, polyurethane material having an overall density of 200-1000 kg/m$^3$ and preferably of 200-500 kg/m$^3$, a compression load at 40% deflection of at least 25 kPa and preferably of 50-500 kPa and an oxyethylene content of 25-70 and preferably 35-60% by weight. Preferably, such material is made according to the above process.

Most catalysts used in making polyurethane materials are amines and tin compounds. It is a great advantage when such materials can be made without such catalysts. The above process provides this opportunity.

In the context of the present invention the following terms have the following meaning:

1) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

2) Reaction system: a combination of components wherein the polyisocyanates are kept in one or more containers separate from the isocyanate-reactive components.

3) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.

4) The term "nominal hydroxyl functionality" is used herein to indicate the functionality (number of hydroxyl groups per molecule) of the polyol or polyol composition on the assumption that this is the functionality (number of active hydrogen atoms per molecule) of the initiator(s) used in their preparation although in practice it will often be somewhat less because of some terminal unsaturation.

5) The word "average" refers to number average unless indicated otherwise.

Polyisocyanates used for preparing the polyurethane materials may be selected from aliphatic, cycloaliphatic and araliphatic polyisocyanates, especially diisocyanates, like hexamethylene diisocyanate, isophorone diisocyanate, cyclohexane-1,4-diisocyanate, 4,4-dicyclohexylmethane diisocyanate and m- and p-tetramethylxylylene diisocyanate, and, in particular, aromatic polyisocyanates like toluene diisocyanates (TDI), phenylene diisocyanates, naphthalene diisocyanates and most preferably methylene diphenylene diisocyanates (MDI) and its homologues having an isocyanate functionality of more than two, like crude MDI and polymeric MDI.

Preferred polyisocyanates are methylene diphenylene diisocyanates selected from pure 4,4'-MDI, isomeric mixtures of 4,4'-MDI, 2,4'-MDI and less than 10% by weight of 2,2'-MDI, and modified variants of these diisocyanates containing carbodiimide, uretonimine, and/or urethane groups, like uretonimine and/or carbodiimide modified MDI having an NCO content of at least 20% by weight and urethane modified MDI obtained by reacting excess MDI and a low molecular weight polyol (molecular weight of up to 1000) and having an NCO content of at least 20% by weight.

Mixtures of the isocyanates mentioned above may be used if desired.

The polyisocyanate may, if desired, contain dispersed urea particles and/or urethane particles prepared in a conventional way (e.g. by adding a minor amount of an isophorone diamine to the polyisocyanate).

The most preferred polyisoycanate is a polyisocyanate containing at least 65%, preferably at least 80%, and more preferably at least 95% by weight of 4,4'-diphenylmethane diisocyanate or a variant thereof. It may consist essentially of pure 4,4'-diphenylmethane diisocyanate or mixtures of that diisocyanate with one or more other organic polyisocyanates, especially other diphenylmethane diisocyanate isomers, for example the 2,4'-isomer optionally in conjunction with the 2,2'-isomer. The most preferred polyisocyanate may also be an MDI variant derived from a polyisocyanate composition containing at least 65% by weight of 4,4'-diphenylmethane diisocyanate. MDI variants are well known in the art, and, for use in accordance with the invention, include liquid (at 25° C.) products obtained by introducing uretonimine and/or carbodiimide groups into said polyisocyanates, such a carbodiimide and/or uretonimine modified polyisocyanate preferably having an NCO value of at least 20% by weight, and/or by reacting such a polyisocyanate with one or more polyols having a hydroxyl functionality of 2-6 and a molecular weight of 62-1000 so as to obtain a modified polyisocyanate, preferably having an NCO value of at least 20% by weight. Up to 25% by weight of another polyisocyanate may be used together with this most preferred polyisocyanate; preferred other polyisocyanates are polymeric MDI and toluene diisocyanate.

The polyol having an oxyethylene content of 50-90% by weight that is used in the prepolymer is selected from polyether polyols, which contain other oxyalkylene groups like oxypropylene and/or oxybutylene groups; preferably these polyether polyols are polyoxyethylene polyoxypropylene polyols. These polyols have an average nominal functionality of 2-6 and preferably of 2-4, an average equivalent weight of 500-5000 and preferably of 1000-4000 and a molecular weight of 2000-12000 and more preferably of 2000-10000 and preferably have an oxyethylene content of 60-85% by weight. The distribution of the oxyethylene and other oxyalkylene groups over the polymer chains may be of the type of a random distribution, a block copolymer distribution or a combination thereof. Mixtures of polyols may be used. Methods to prepare such polyols are known and such polyols are commercially available; examples are Arcol™ 2580 polyol from Bayer, Caradol™ 3602 polyol from Shell, Lupranol™ 9205 polyol from BASF and Daltocel® F442 polyol from Huntsman Polyurethanes (Daltocel is a trademark of Huntsman International LLC).

The prepolymer is made according to methods known in the art. Prepolymers of this type are known (see e.g. EP 547765 and WO 00/55232). The polyisocyanate and the polyol in general are combined in a relative amount so as to arrive at a desired NCO-value and allowed to react, if desired, at elevated temperature and in the presence of catalyst. Preferably no catalyst is used.

Water is used in an amount of 25-500 pbw per 100 pbw of prepolymer; preferably, this amount is 25-300 pbw per 100 pbw of prepolymer.

One of the surprising findings is that no other ingredients are needed in order to prepare the elastomeric materials according to the present invention than the prepolymer and the water. This is one of the preferred embodiments of the present invention; namely, in the process according to the present invention no other material is used than the prepolymer and the water.

However, if desired other isocyanate-reactive compounds (other than water) that are often used in making moulded elastomeric materials may be used here as well. Examples of such other compounds are chain extenders and cross-linkers that are isocyanate-reactive compounds having an equivalent weight below 500 and a functionality of 2 and 3-8, respectively, and other isocyanate-reactive compounds having an average equivalent weight of more than 500, like polyester polyols, polyether amines and polyether polyols having an oxyethylene content lower than 50 or higher than 90% by weight.

Examples of such chain-extenders and cross-linkers are ethylene glycol, propane diol, 2-methyl-propane-1,3diol, butanediol, pentane diol, hexane diol, diethylene glycol, propylene glycol, dipropylene glycol, polyoxyethylene diols and triols having an equivalent weight below 500, glycerol, trimethylolpropane, pentaerythritol, sucrose, sorbitol, mono-, di- and tri-ethanolamine, ethylenediamine, toluenediamine, diethyltoluene diamine and polyester diamines and triamines having an equivalent weight below 500.

Preferably, the amount of such other isocyanate-reactive compounds used in the process according to the present invention is less than 5% by weight calculated on the amount of prepolymer used. More preferably, this amount is less than 1% by weight.

If desired, additives that are known for their use in elastomeric polyurethane materials may be used in the process according to the present invention. Examples of such additives are: catalysts enhancing the formation of urethane bonds like 1) metal catalysts like tin octoate and dibutyltin dilaurate, 2) tertiary amine catalysts like triethylenediamine and imidazoles like dimethylimidazole and 3) other catalysts like maleate esters and acetate esters; surfactants; fire retardants; smoke suppressants; UV-stabilizers; colorants; microbial inhibitors; fillers; internal and external mould release agents; phase change materials like salt hydrates, clathrates, fatty acids, linear hydrocarbons like n-eicosane and n-hexadecane; dyes; fragrances; hygroscopic materials like $CaCl_2$ and silicagel; superabsorbent polymers; fungicides; insecticides; other pesticides; adsorbants; rubber and other polymer latices; clays like nano-clays and hollow microparticles like Expancel™ product.

As already said, however, preferably no catalysts are used.

The elastomeric materials according to the present invention are made by feeding the prepolymer and the water, separately or mixed, into an open or closed mould, by closing the mould in case it was open in the previous step, allowing the prepolymer and the water to react and, if desired, to dry the elastomeric material obtained, at a temperature higher than the ambient temperature, by heating and/or by subjecting it to radiation, e.g. microwave radiation. The drying may be conducted in the mould or after the elastomeric material has been taken out of the mould. The internal surface of the mould may be treated with external mould release agent. If more than one moulding is to be made then the internal surface of the mould may be treated with such external mould release agent before the first moulding has been made, but without treating the mould with such agent before subsequent mouldings, as described in WO 00/55232.

The process may be conducted in any type of mould known in the art. Examples of such moulds are the moulds commercially used for making polyurethane furniture parts, automotive seating and automotive parts, like steering wheels, armrests, head-rests, body panels and bumpers, and outsoles, midsoles and insoles for footwear.

The material of the mould may be selected from those known in the art like metal, e.g. stainless steel and aluminum, and epoxy resin.

If other isocyanate-reactive compounds or additives are used in making the elastomeric materials, then these may be fed into the mould separately or together (dissolved, dispersed or emulsified—as the case may be) in the water.

The amount of prepolymer, water and optional other isocyanate-reactive compounds and additives which is fed into the mould preferably is such that the free rise volume obtainable with such an amount is 10-1000% more than the internal volume of the mould, and most preferably, this is 25-500% higher. The prepolymer, the water and/or the mould may be heated prior to the prepolymer and the water are fed into the mould. If desired, the temperature of the water is higher than the temperature of the prepolymer, as disclosed in EP 793681.

The elastomeric polyurethane materials obtained further show a good compression set and resilience and can be used as indicated before. The overall density (OD, kg/m$^3$) and the compression load deflection at 40% (CLD, 40% kPa) are measured according to DIN 53420 and DIN 53577 respectively. The physical properties are to be measured after the mouldings have been dried to such an extent that the weight of the moulding does not decrease with more than 0.5% per hour when kept at 50° C.

The invention is illustrated with the following non-limiting examples:

EXAMPLES

Example 1

A prepolymer was prepared by reacting Suprasec® MPR isocyanate (Huntsman International LLC), and Caradol™ 3602 polyol (Shell), at ambient conditions at a weight ratio of 40:60. To 75.5 g of this prepolymer was added 37.75 g of water, followed by mixing, pouring into an aluminum mould (ambient temperature), closing the mould and allowing to react. The internal mould size was 15×20×1.5 cm and the internal surface was sprayed with Münch ES-940/M external mould release agent. After 5 minutes, the moulded elastomeric polyurethane material was removed and dried at 50° C. for 24 hours in an oven.

Example 2

Example 1 was repeated with the proviso that the amount of water was 75.5 grams.

Example 3

Example 1 was repeated with the proviso that Caradol™ 3602 polyol was replaced by a polyoxyethylene polyoxypropylene polyol having a molecular weight of 8000, a nominal hydroxyl functionality of 3, and an oxyethylene content of 75% by weight (all random). 114.2 g of prepolymer and 57.1 g of water were mixed and poured into the mould.

The physical properties of the elastomers obtained are given in the following table.

|  | Example | | |
| --- | --- | --- | --- |
|  | 1 | 2 | 3 |
| Density, kg/m$^3$ (DIN 53420) | 253 | 313 | 386 |
| Resilience, % (ISO 8307) | 47 | 42 | 63 |
| Tensile at break, kPa (DIN 53504) | 637 | 402 | 1050 |
| Strain at break, % (DIN 53504) | 110 | 131 | 154 |
| Compression load deflection at 40%, kPa (DIN 53577) | 72 | 98 | 131 |

What is claimed is:

1. A process for preparing a moulded, elastomeric, polyurethane material having an overall density of 200-1000 kg/m$^3$ and a compression load at 40% deflection of 25-500 kPa comprising reacting in a closed mould an isocyanate terminated prepolymer, having an NCO-value of 5-15% by weight and being the reaction product of a polyisocyanate and a polyether polyol having an average nominal functionality of 2-6, an average equivalent weight of 500-5000, and an oxyethylene content of 50-90% by weight, and 25-300 parts by weight of water per 100 parts by weight of prepolymer, wherein the polyisocyanate is a polyisocyanate containing at least 65% by weight of 4,4'-diphenylmethane diisocyanate or a variant thereof and wherein no catalyst is used and wherein other isocyanate-reactive compounds are used in an amount of at most 5 parts by weight per 100 parts by weight of prepolymer, and wherein the amount of prepolymer, water, and optionally other isocyanate-reactive compounds is such that the free rise volume obtained with such amount is 25-500% more than the internal volume of the mould.

* * * * *